Aug. 27, 1963
K. C. MARD
3,101,979
VISCOUS DAMPED BEARING SUPPORT
Filed June 19, 1961
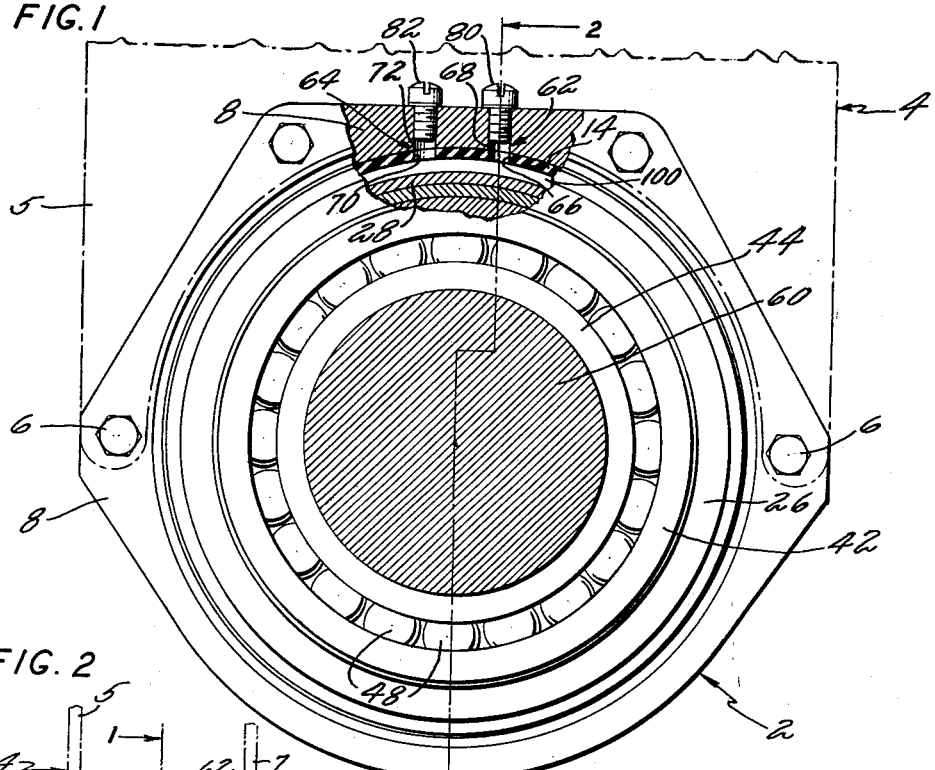
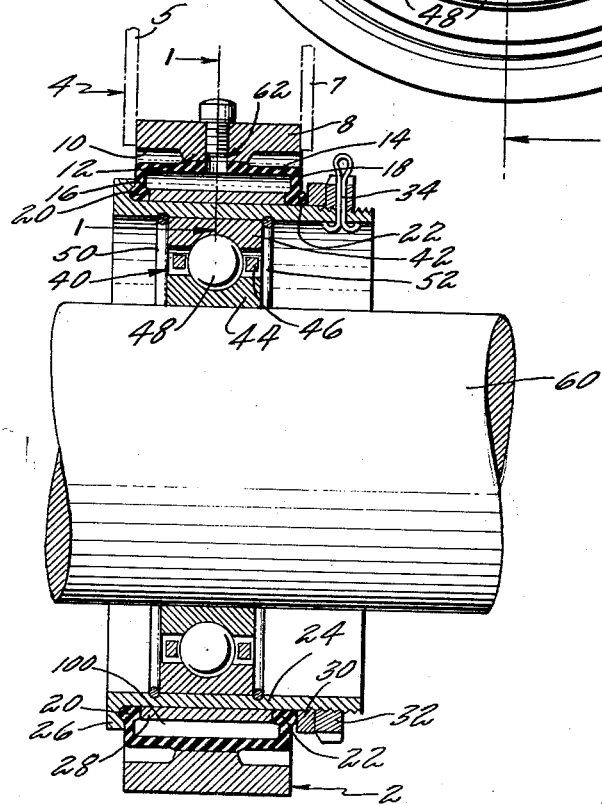
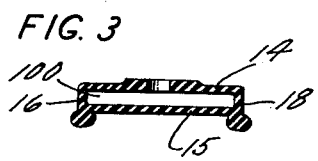
INVENTOR
KENNETH C. MARD
BY Jack N. W. Carther
AGENT

United States Patent Office 3,101,979
Patented Aug. 27, 1963

3,101,979
VISCOUS DAMPED BEARING SUPPORT
Kenneth C. Mard, Stratford, Conn., assignor to United Aircraft Corporation, East Hartford, Conn., a corporation of Delaware
Filed June 19, 1961, Ser. No. 117,938
7 Claims. (Cl. 308—26)

This invention relates to a damped bearing support, and more particularly a support for a relatively long driving shaft.

As is known, when a shaft velocity increases it passes through ranges of critical speeds. An object of this invention is to provide a bearing support which allows a shaft to traverse a critical speed or range of speeds and rotate with a minimum of vibration and unbalance at its operating speeds.

Another object of this invention is to provide a bearing support which allows a shaft to operate above its first critical speed and isolate the shaft from its supporting structure.

A further object of this invention is to provide a bearing support having a fluid filled deformable body separating a bearing for mounting a shaft and a structure which is to support the bearing.

Another object of this invention is to provide vibration isolation and damping means for a shaft bearing which includes an annular resilient member extending between the bearing support and the body on which the shaft is to be supported. Said resilient member being hollow and capable of being filled with fluid.

A further object of this invention is to provide a reduction in the transmission of vibrations and noise from a shaft and bearings to a supporting structure.

Other objects and advantages will become apparent from a reading of the specification along with the accompanying drawings.

FIG. 1 is an end view of the invention, partially in section, showing a shaft connected to supporting structure.

FIG. 2 is a sectional view taken along the line 2—2 of FIG. 1. FIG. 3 is a view of a modified annular flexible member.

As seen in FIG. 1, the bearing assembly 2 is fixed to the mounting structure 4 by bolts 6. The mounting structure includes two flanges 5 and 7 which extend around a portion of each end of the bearing assembly. The structure 4 may be part of an aircraft, automobile, or other mounting means. The bearing assembly 2 comprises a housing 8. Housing 8 has an opening 10 therethrough. The opening 10 has a small circular section formed by an annular flange 12 which extends inwardly from the housing 8. The end of the flange 12 has a surface which extends around an axis forming a short cylindrical section.

An annular rubber member 14 of substantially U-shape cross section, in which the open part of the U faces inwardly, is bonded around its outer extremity to the end of flange 12. The outer circumference of the rubber member 14 is positioned axially so that it is centered on said flange 12. The opening 10 on either side of the flange 12 is cut back a distance so that in operation the rubber member will not contact the unflanged portion of the housing but will contact flange 12 of housing 8. Each inwardly projecting rubber flange, 16 and 18, forming the sides of the U, has an enlarged portion, 20 and 22, respectively at its end. The length of the flanges are substantially equal so that the annular openings formed by the outer ends of the enlarged portions are substantially equal. These enlarged portions are used to provide a sealing function which will be hereinafter described.

A cylindrical liner 24 having an outer diameter substantially equal to the openings presented by the inwardly extending flanges of the rubber member 14 extends through said openings. The liner 24 is positioned so that its outer surface and the inner edge of the enlarged portions of the arms of the U-shaped rubber member engage each other. An outwardly extending flange 26 on the liner 24 engages the outer side of the enlarged portion 20 of rubber flange 16 while a spacer member 28 is positioned on the outer surface of the liner 24 so that one end engages the inner side of the enlarged portion 20 of flange 16 and the other end engages the inner side of the other enlarged portion 22 of rubber flange 18. This fixes the distance between the flanges 16 and 18 so that they are maintained in a proper position.

A washer member 30 is positioned on the outer side of the liner 24 so that one end engages the outer side of the enlarged portion 22 of flange 18. The outer surface of liner 24 is externally threaded on the end projecting away from the flange 18 of the annular rubber member 14. An annular nut 32 is threadably mounted on said threaded portion of the liner 24 and moved to a position where the enlarged portion 20 of flange 16 is squeezed between flange 26 of the cylindrical liner 24 and the end of spacer 28 adjacent thereto; and the enlarged portion 22 of flange 18 is squeezed between the other end of spacer 28 and washer 30. A sealing material can be applied to the surface of the enlarged portions 20 and 22 before they are compressed into position by the tightening of annular nut 32. The annular nut 32 is locked into place when the proper amount of torque has been applied thereto. This may be done by a cotter pin 34 such as shown in FIG. 2. Other locking means can be used if desired.

A bearing assembly 40 is fixedly positioned within the cylindrical liner 24. The bearing assembly 40 comprises an outer bearing ring 42, an inner bearing ring 44, a bearing retainer 46, and balls 48. The outer bearing ring is fixed within the cylindrical liner 24 by being positioned between two snap rings 50 and 52. These snap rings fit into grooves located in the surface of the liner 24. A shaft 60 is positioned in the inner bearing ring 44.

The length of the flanges 16 and 18 and the thickness of the spacer 28 are such that an annular chamber 100 is formed. In view of the resilient member 14 the chamber is a deformable one. Access to this chamber is obtained through two passages 62 and 64. Passage 62 is formed by opening 66 in the annular rubber member 14 and opening 68 in the housing 8. Passage 64 is formed by opening 70 in the annular rubber member 14 and opening 72 in the housing 8. Openings 68 and 72 in housing 8 are internally threaded to receive bolts 80 and 82, respectively, to control the passing of fluid through the passages. To fill the chamber 100 formed between the bearing assembly 40 and housing 8, both bolts 80 and 82 are removed and a fluid is passed through into one passage until it flows out of the other. The bolts 80 and 82 are then put back in place. This fills the chamber. A sealing material can be applied to the surfaces of the bolts and their respective passages to insure that there is no leakage at these points.

The annular rubber member 14 may be formed of substantially U-shaped cross section with an integral web 15 located between the flanges 16 and 18 which form the sides of the U. This will provide a more permanent type seal for the chamber 100.

The annular rubber member 14 may also be formed without openings 66 and 70 and the fluid can be injected by a needle. Any air within can be allowed to escape by the use of another needle. This member will be made having a self-sealing substance.

It is to be understood that the invention is not limited to the specific illustrations and description but may be used in other ways without departure from its spirit as defined by the following claims.

I claim:
1. In combination,
   (a) a housing,
   (b) said housing having a surface defining an opening therein,
   (c) annular bearing means,
   (d) vibration absorbing means connecting said bearing means to said surface,
   (e) said vibration absorbing means including,
      (1) a first annular resilient member of substantially U-shaped cross section,
      (2) second annular means for forming an annular chamber with said first annular resilient member,
      (3) means connecting said second annular means to the open end of the U-shaped first annular resilient member,
      (4) said last named connecting means providing a detachable connection between the second annular means and first annular resilient member,
      (5) said annular chamber containing fluid,
      (6) said annular chamber being continuous so that the fluid can flow around the chamber.
2. In combination,
   (a) a housing,
   (b) said housing having a surface defining an opening therein,
   (c) annular bearing means,
   (d) vibration absorbing means connecting said bearing means to said surface,
   (e) said vibration absorbing means including,
      (1) a first annular resilient member of substantially U-shaped cross section,
      (2) second annular means for forming an annular chamber with said first annular resilient member,
      (3) means connecting said second annular means to the open end of the U-shaped first annular resilient member,
      (4) said last named connecting means providing a detachable connection between the second annular means and first annular resilient member,
      (5) means connecting said first annular resilient member to said surface,
      (6) means detachably connecting said second annular means to said bearing,
      (7) said annular chamber containing fluid,
      (8) said annular chamber being continuous so that the fluid can flow around the chamber.
3. In combination,
   (a) a housing,
   (b) said housing having an opening therein,
   (c) a resilient member having two annular flanges extending inwardly,
   (d) means fixing said resilient member to said housing within said opening,
   (e) the flanges of the resilient member extending radially inwardly from the housing,
   (f) a cylindrical member,
   (g) said cylindrical member being detachably connected to the ends of the flanges forming a chamber,
   (h) said chamber containing fluid,
   (i) said chamber being annular and continuous so that the fluid can flow around the chamber,
   (j) bearing means,
   (k) said bearing means being fixed within said cylindrical member,
   (l) said housing on each side of said fixing means being spaced from said flanges providing freedom of deformation of said flanges in an axial direction.
4. In combination,
   (a) a housing,
   (b) said housing having a surface defining an opening therein,
   (c) annular bearing means,
   (d) vibration absorbing means connecting said bearing means to said surface,
   (e) said vibration absorbing means including,
      (1) a first annular resilient member having two flanges extending inwardly,
      (2) means fixed to said flanges for forming an annular chamber and for supporting said bearing means,
      (3) said chamber containing fluid,
      (4) said last named means including a rigid cylindrical member,
      (5) a sleeve slidably mounted on said cylindrical member,
      (6) flange means extending outwardly on each end of said cylindrical member,
      (7) one inwardly extending resilient flange having its inner circumference located between the flange means on one end of said cylindrical member and the adjacent end of the sleeve,
      (8) the other inwardly extending resilient flange having its inner circumference located between the other flange means on the other end of said cylindrical member and the other end of the sleeve,
      (9) means fixing said bearing means in said rigid cylindrical member.
5. In combination,
   (a) a housing,
   (b) said housing having a surface defining an opening therein,
   (c) annular bearing means,
   (d) vibration absorbing means connecting said bearing means to said surface,
   (e) said vibration absorbing means including,
      (1) a first annular resilient member having two flanges extending inwardly,
      (2) means detachably fixed to said flanges for forming an annular chamber and for supporting said bearing means,
      (3) said last named means including a rigid cylindrical member,
      (4) said rigid cylindrical member having means for making an annular connection with each free annular end of the two flanges,
      (5) one inwardly extending resilient flange having its inner circumference located at a first position on one side of the annular bearing means,
      (6) the other inwardly extending resilient flange having its inner circumference located at a second position on the other side of the annular bearing means,
      (7) means fixing said bearing means in said rigid cylindrical member.
6. In combination,
   (a) a housing,
   (b) said housing having a surface defining on opening therein,
   (c) annular bearing means,
   (d) vibration absorbing means connecting said bearing means to said surface,
   (e) said vibration absorbing means including,
      (1) a first annular resilient member having two flanges extending inwardly,
      (2) means detachably fixed to said flanges for forming an annular chamber and for supporting said bearing means,
      (3) said last named means including a rigid cylindrical member,

(4) said rigid cylindrical member having flange means for making a detachable annular connection with each free annular end of the two flanges,
(5) one inwardly extending resilient flange having its inner circumference located at a first position on one side of the annular bearing means,
(6) the other inwardly extending resilient flange having its inner circumference located at a second position on the other side of the annular bearing means,
(7) means fixing said bearing means in said rigid cylindrical member.

7. In combination,
(a) a housing,
(b) said housing having a surface defining an opening therein,
(c) annular bearing means,
(d) vibration absorbing means connecting said bearing means to said surface,
(e) said vibration absorbing means including,
(1) a first annular resilient member having two flanges extending inwardly,
(2) means detachably fixed to said flanges for forming an annular chamber and for supporting said bearing means,
(3) said last named means including a rigid cylindrical member,
(4) said rigid cylindrical member having means for making an annular connection with each free annular end of the two flanges,
(5) one inwardly extending resilient flange having its inner circumference located at a first position on one side of the annular bearing means,
(6) the other inwardly extending resilient flange having its inner circumference located at a second position on the other side of the annular bearing means,
(7) means fixing said bearing means in said rigid cylindrical member,
(8) said first position on one side of the annular bearing means being located adjacent one end of said rigid cylindrical member,
(9) the second position on the other side of the annular bearing means being located adjacent the other end of said rigid cylindrical member.

References Cited in the file of this patent

UNITED STATES PATENTS

| | | |
|---|---|---|
| 1,370,599 | Leon | Mar. 8, 1921 |
| 2,155,919 | Wooler et al. | Apr. 25, 1939 |
| 2,581,656 | Harless | Jan. 8, 1952 |
| 2,614,896 | Pierce | Oct. 21, 1952 |
| 3,001,390 | Zimmer | Sept. 26, 1961 |

FOREIGN PATENTS

| | | |
|---|---|---|
| 400,650 | France | Mar. 15, 1909 |
| 1,036,487 | Germany | Aug. 14, 1958 |